United States Patent [19]

Gergen et al.

[11] Patent Number: 4,839,435

[45] Date of Patent: Jun. 13, 1989

[54] POLYMER BLEND OF CARBON MONOXIDE/OLEFIN COPOLYMER AND A POLY(ARYLSULFONE) POLYMER

[75] Inventors: William P. Gergen, Houston, Tex.; Robert G. Lutz, Santa Rosa, Calif.

[73] Assignee: Shell Oil Company, Houston, Tex.

[21] Appl. No.: 203,958

[22] Filed: Jun. 8, 1988

[51] Int. Cl.$^4$ .............................................. C08L 81/06
[52] U.S. Cl. ................................... 525/391; 525/390; 525/534; 525/535; 525/539; 528/392
[58] Field of Search .................. 525/55, 153; 528/391, 528/392

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,729,527 | 4/1973 | Nield | 260/857 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 11/1987 | European Pat. Off. . |
| 1081304 | 8/1965 | United Kingdom . |

*Primary Examiner*—Harold D. Anderson
*Assistant Examiner*—T. Mason

[57] ABSTRACT

A polymeric blend of improved properties is prepared by uniformly mixing a linear alternating polymer of carbon monoxide and at least one ethylenically unsaturated hydrocarbon and a poly(arylsulfone) polymer.

8 Claims, No Drawings

POLYMER BLEND OF CARBON MONOXIDE/OLEFIN COPOLYMER AND A POLY(ARYLSULFONE) POLYMER

FIELD OF THE INVENTION

This invention relates to improved blends comprising a linear alternating polymer of carbon monoxide and at least one ethylenically unsaturated hydrocarbon and other polymeric material. More particularly, the invention relates to blends of the linear alternating polymer and poly(arylsulfone) polymer.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content by reaction in the presence of free radical catalysts, e.g., peroxy compounds. U.K. No. 1,081,304 produced similar polymers of higher carbon monoxide content in the presence of alkylphosphine complexes of palladium salts as catalyst. Nozaki extended the process to produce linear alternating polymers through the use of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest because of the greater availability of the polymers. Such polymers, for example, copolymers of carbon monoxide and ethylene or terpolymers of carbon monoxide, ethylene and propylene, are often referred to as polyketones or polyketone polymers and have been shown to be of the repeating formula —CO—(A)— wherein A is the moiety of unsaturated hydrocarbon polymerized through the ethylenic unsaturation. For example, when the unsaturated hydrocarbon is ehtylene, the polymers are represented by the repeating formula —CO—(CH₂—CH₂)—. The general process for the production of such polymers is illustrated by a number of published European Patent Application Nos. including 0,121,965 and 0,181,014. The process generally involves use of a catalyst composition formed from a compound of palladium, cobalt or nickel, the anion of a non-hydrohalogenic acid having a pKa below 2 and a bidentate liquid of phosphorus, arsenic or antimony.

The resulting polyketone polymers are relatively high molecular weight thermoplastics having utility in the production by conventional procedures of shaped articles such as containers for the food and drink industry and shaped parts for the automotive industry. For some particular applications, it has been shown to be desirable to have properties of a polymeric composition which are somewhat different from those of the polyketone polymer. It would be of advantage to retain the desirable properties of the polyketone polymer and yet improve other properties. These advantages are often obtained through the provision of a polymer blend.

SUMMARY OF THE INVENTION

This invention relates to blends of linear alternating polymer of carbon monoxide and at least one ethylenically unsaturated hydrocarbon with other polymeric material. More particularly, there is provided, according to the invention, blends of the linear alternating polymer and poly(arylsulfone) polymer. Such blends demonstrate improved tensile modulus as well as increased tensile strength.

DESCRIPTION OF THE INVENTION

The polyketone polymers which are employed as the major component in the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, 1-butene, isobutylene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one molecule of carbon monoxide for each molecule of hydrocarbon. When terpolymers of carbon monoxide, ethylene and a second hydrocarbon are employed in the blends of the invention there will be, within the polyketone polymer, at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain is therefore represented by the formula

$$-\!\!\left[CO\!-\!(CH_2\!-\!CH_2)\right]_{x}\!\!\left[CO\!-\!(B)\right]_{y}\!- \qquad I$$

where B is the moiety obtained by polymerization of the second hydrocarbon through the ethylenic unsaturation. The —CO—(CH₂—CH₂)— units and the —CO—(B)— units are found randomly throughout the polymer chain and the ratio of y:x is no more than about 0.5. In the modification of the invention where copolymer of carbon monoxide and ethylene is employed, the second hydrocarbon is not present in the polyketone polymer chain and the copolymer is represented by the above formula I wherein y=0. When y is other than 0, i.e., a terpolymer is employed, ratios of y:x from about 0.01 to about 0.1 are preferred. The end groups or "caps" of the polymer chain will depend on what materials are present during the production of the polymer and whether and how the polymer has been purified. The precise nature of the end groups is of little significance so far as the overall properties of the polymer are concerned, however, and the polyketone polymer is fairly represented by the above formula. Of particular interest are the polymers of the above formula I of number average molecular weight from about 1,000 to about 200,000, more particularly those of a number average molecular weight of from about 20,000 to about 90,000 as determined by gel permeation chromatography (GPC), containing substantially equimolar quantities of carbon monoxide and unsaturated hydrocarbon.

The physical properties of such polyketone polymers will depend in part on the molecular weight of the polymer, whether the polymer is a copolymer or a terpolymer and the relative proportion of the second hydrocarbon in the case of terpolymers. Typical melting points of such polymers are from about 175° C. to about 300° C., more often from about 210° C. to about 270° C.

A method of producing the polyketone polymers which is now becoming conventional is to contact the carbon monoxide and hydrocarbon(s) with a catalyst composition formed from a palladium compound, an anion of a non-hydrohalogenic acid of pKa below about 6 and a bidentate ligand of phosphorus. Such a process for polyketone production is illustrated by copending U.S. patent application Ser. No. 930,468, filed Nov. 14, 1986 (Docket No. K-0722). The scope of the process is extensive, and without wishing to be limited a preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane.

Polymerization is conducted under polymerization conditions in the gaseous phase or in a liquid phase in the presence of a reaction diluent, e.g., a lower alkanol such as methanol or ethanol. The reactants are contacted by conventional methods such as by shaking or stirring. Suitable reaction temperatures are from about 20° C. to about 150° C. with preferred temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polyketone polymer may contain residues of the catalyst composition which are removed, if desired, by treatment of the polymer product with a solvent or a complexing agent which is selective for the residues.

The poly(arylsulfone) polymer employed as the minor component of the blends of the invention is a polymer wherein the repeating unit is a polyaryl sulfone moiety in which the aryl portion comprises at least two arylene, particularly phenylene, rings which are directly connected, or are joined by an oxygen, sulfur or alkylidine connecting group or mixtures of such connected ring systems. The class of such poly(arylsulfone) polymers is conventional and well known in the art and is represented by the repeating formula

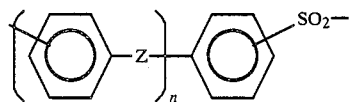

II wherein Z independently is a direct carbon-carbon bond between the indicated phenylene rings, oxygen, sulfur or

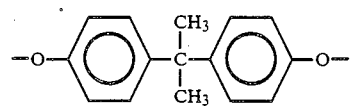

and n is 1 or 2. While the relative substitution on the phenylene rings of the above formula II is suitably ortho, meta or para or mixtures thereof, the preferred poly(arylsulfone) polymers contain phenylene moieties wherein the connecting groups are entirely para to the other connecting group on the same phenylene ring. Such preferred poly(arylsulfone) polymers are represented by the following repeating formulas which are embodiments of the above formula II of differing Z connecting groups.

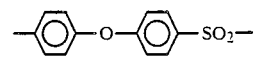      IIa

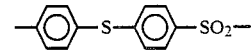      IIb

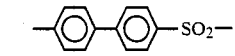      IIc

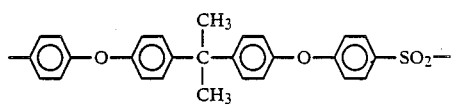      IId or mixtures thereof.

These poly(arylsulfone) polymers are well known in the art. Methods for preparing such poly(arylsulfone) polymers are disclosed in the references cited in the first column of U.S. Pat. No. 3,729,527. At sufficiently high molecular weight, the poly(arylsulfones) are engineering thermoplastics with high melting points and glass transition temperatures. Several of the types of such polymers are commercially available. Poly(ether sulfones) i.e., the polysulfones of the above type IIa are available from ICI United States, Inc. as Grade 200P and Grade 300P. The polymers of the above type IId are available from Amoco as UDEL® Polysulfone Resin and RADEL® Polysulfone Resin. While the scope of the poly(arylsulfone) polymers which are suitably employed in the blends of the invention is extensive, the preferred poly(arylsulfone) polymers are those of the above types IIa and IId, particularly the poly(ether sulfones) of type IId.

The blends of the invention are predominantly polyketone polymer with a lesser proportion of poly(arylsulfone) polymer. The precise proportion of poly(arylsulfone) polymer to be employed is not critical and percentages from about 0.5% by weight to about 35% by weight, based on total blend, of the poly(arylsulfone) polymer are satisfactory. Preferred blends contain from about 5% by weight to about 25% by weight, on the same basis, of the poly(arylsulfone) polymer.

The method of producing the blends of the polyketone polymer and the poly(arylsulfone) polymer is not material so long as an intimate blend of the two components is obtained without undue degradation of the components or the resulting blend. Because of the relatively high melting points of the polyketone polymer and the poly(arylsulfone) polymer, blending at an elevated temperature is usually required. A particularly useful procedure is to intimately mix the polymers in the form of granules and/or powder in a high shear mixer. "Intimately mixing" means to mix the polymers with sufficient mechanical shear and thermal energy to ensure that the components will not delaminate on processing. Intimate mixing is typically achieved by employing high shear extrusion compounding machines such as twin screw compounding extruders and thermoplastic extruders.

The blends of the polyketone polymer and the poly(arylsulfone) polymer are non-miscible blends having properties improved over the polyketone polymer. The poly(arylsulfone) polymer exists as a discrete phase within the polyketone matrix. The blends are not, of course, homogeneous but good blends are obtained when the poly(arylsulfone) polymer is uniformly distributed through the polyketone matrix.

The blends of the invention may also include conventional additives such as antioxidants and stabilizers, fillers and fire resistant materials, mold release agents, pigments and other materials which are designed to increase the processability of the polymer or improve the properties of the resulting blend. Such additives are added by conventional methods prior to, together with or subsequent to the blending of the polyketone polymer and the poly(arylsulfone) polymer.

The blends of the invention show an improved tensile modulus and tensile strength and are of particular utility in instances where molded parts are desired which require strength. The blends are processed by the usual techniques such as extrusion and injection molding into, among other things, sheets, films, plates and molded objects. Illustrative of applications for the blends of the invention are in the production of both internal and external parts for the automotive industry and structural parts for application in the construction industry.

The invention is further illustrated by the following Illustrative Embodiments which should not be construed as limiting the invention.

ILLUSTRATIVE EMBODIMENT I

A linear alternating terpolymer of carbon monoxide, ethylene and propylene was prepared in the presence of palladium acetate, the anion of trifluoroacetic acid, and 1,3-bis(diphenylphosphino)propane. The melting point of the polyketone polymer was 225° C. and the limiting viscosity number (LVN) of the polymer was 1.72 measured at 60° C. in m-cresol.

ILLUSTRATIVE EMBODIMENT II

A blend of the polyketone polymer of Illustrative Embodiment I was prepared with 12% by weight of a poly(arylsulfone) polymer of the polyether type consisting predominantly of units of the repeating formula IId

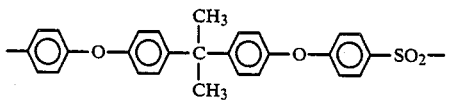

and having a Tg of about 190° C. The poly(arylsulfone) was obtained from Amoco under the tradename Udel P-1700.

The blend was prepared in a 15 mm twin screw Baker Perkins extruder operating at 280° C. with undried feed and under a nitrogen blanket and the extruded strands were passed directly into water. The extruder was operated under maximum torque, resulting in an average residence time of 0.5 min. Approximately 0.2% by weight of Irganox 1076, a conventional hindered phenolic antioxidant, was added to provide background stabilization. The extruded blend was examined under an electron microscope employing samples which were cold cut and stained with ruthenium tetroxide. The blend was non-miscible containing a few large "gobs" of poly(arylsulfone) of about 11μ phase size thought to result from incomplete mixing. Most of the poly(arylsulfone) polymer was observed as a discrete phase of a phase size of about 2.5 microns dispersed uniformly in a polyketone polymer matrix.

ILLUSTRATIVE EMBODIMENT III

A linear alternating terpolymer of carbon monoxide, ethylene and propylene was prepared in the presence of palladium acetate, the anion of p-toluenesulfonic acid and 1,3-bis[di(2-methoxyphenyl)phosphino]propane. The melting point of the polymer was 220° C. and the LVN of the polymer was 1.96 measured at 60° C. in m-cresol.

ILLUSTRATIVE EMBODIMENT IV

A blend of the terpolymer of Illustrative Embodiment III was prepared with 20% by weight of the Udel P-1700 poly(arylsulfone) used in Illustrative Embodiment II. The blend was prepared by similar procedure to Illustrative Embodiment II in a 30 mm twin screw Haake extruder at 275° C. Approximately 0.5% by weight of AO 330, a conventional hindered phenolic antioxidant was added to provide background stabilization. The blend was injection molded to prepare a standard test specimen which was tested for tensile modulus and tensile strength according to ASTM Test Method D638.

A sample of the terpolymer of Illustrative Embodiment III was also injection molded and tested as a standard. The results of the tests are given in Table I which shows the improved properties of the blend when compared to the standard.

TABLE I

| Sample | Tensile Modulus | Tensile Strength |
| --- | --- | --- |
| Standard | 185,000 psi | 8,700 psi |
| 20% by w blend of polyarylsulfone | 218,000 psi | 9,200 psi |

What is claimed is:

1. A composition comprising a non-miscible blend of a linear alternating polymer of carbon monoxide and at least one ethylenically unsaturated hydrocarbon and a poly(arylsulfone) polymer.

2. The composition of claim 1 wherein the linear alternating polymer is represented by the formula

wherein B is a moiety of an ethylenically unsaturated hydrocarbon of at least 3 carbon atoms and the ratio of y:x is no more than about 0.5.

3. The composition of claim 2 wherein the poly(arylsulfone) polymer is represented by the repeating formula

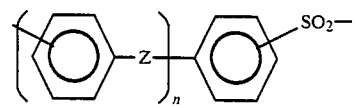

wherein Z independently is a direct carbon-carbon bond, or Z is oxygen, sulfur or

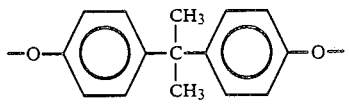

and n is 1 or 2, and the poly(arylsulfone) is present in an amount from about 0.5% by weight to about 35% by weight, based on the total blend.

4. The composition of claim 3 wherein y is 0.

5. The composition of claim 3 wherein B is a moiety of propylene.

6. The composition of claim 5 wherein the poly(arylsulfone) polymer is represented by a repeating formula selected from

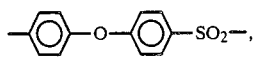

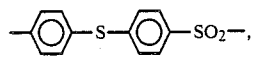

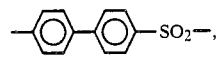

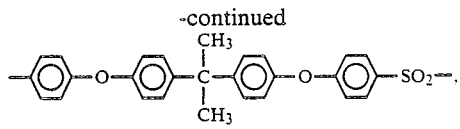

or mixtures thereof.

7. The composition of claim 6 wherein the repeating formula is

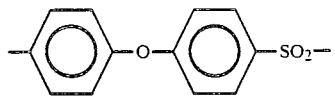

and the poly(arylsulfone) polymer is present in an amount from about 5% by weight to about 25% by weight, based on total blend.

8. The composition of claim 6 wherein the repeating formula is

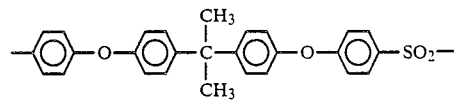

and the poly(arylsulfone) polymer is present in an amount from about 5% by weight to about 25% by weight, based on total blend.

* * * * *